(12) United States Patent
Donadeo

(10) Patent No.: US 8,656,395 B2
(45) Date of Patent: Feb. 18, 2014

(54) METHOD AND SYSTEM FOR OPTIMIZING A JOB SCHEDULER IN AN OPERATING SYSTEM

(75) Inventor: Rossella Donadeo, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1395 days.

(21) Appl. No.: 12/121,150

(22) Filed: May 15, 2008

(65) Prior Publication Data

US 2009/0288095 A1 Nov. 19, 2009

(51) Int. Cl.
*G06F 9/46* (2006.01)

(52) U.S. Cl.
USPC .......................................................... 718/102

(58) Field of Classification Search
USPC .......................................................... 718/102
See application file for complete search history.

(56) References Cited

U.S. PATENT DOCUMENTS

| | | | |
|---|---|---|---|
| 6,105,053 A * | 8/2000 | Kimmel et al. | 718/105 |
| 7,302,450 B2 | 11/2007 | Benedetti et al. | |
| 2006/0149576 A1 * | 7/2006 | Ernest et al. | 705/1 |
| 2006/0242648 A1 | 10/2006 | Guccione et al. | |
| 2007/0143762 A1 * | 6/2007 | Arnold et al. | 718/103 |
| 2008/0010642 A1 | 1/2008 | MacLellan et al. | |
| 2008/0072230 A1 | 3/2008 | Jackson | |

* cited by examiner

*Primary Examiner* — Mengyao Zhe
(74) *Attorney, Agent, or Firm* — King & Spalding

(57) ABSTRACT

A workload scheduler determines how to submit jobs to several scheduler agents across multiple systems. The scheduler engine determines the systems to which it is able to submit jobs. A job is received and analyzed to determine systems to which the job can be submitted. The scheduler engine determines which system will receive the job by evaluating the next system in line and determining if the job can be sent to that system and if that system is currently in a healthy state. The scheduler engine sends the job to the selected system. The scheduler agents inform the scheduler engine when the job is submitted and when it is executed. Once a time period has expired, the engine evaluates the health of each of the systems based on the number of jobs submitted and executed by each system.

20 Claims, 6 Drawing Sheets

METHOD AND SYSTEM FOR OPTIMIZING A JOB SCHEDULER IN AN OPERATING SYSTEM

FIELD OF THE INVENTION

The present invention relates to the field of job scheduling in an enterprise-wide environment. In particular, the present invention supports an optimization routine for job schedulers having access to multiple systems.

BACKGROUND OF THE INVENTION

A job scheduler is a program that enables an enterprise to schedule and, in some cases, monitor computer "batch" jobs. A job is the unit of work that a job scheduler gives to the operating system. Typically, the job scheduler gives the operating system a batch of jobs to do and these are performed in the background when time-sensitive interactive work is not being done. The job is typically described with job control language ("JCL") and is broken down into job steps.

The job scheduler can initiate and manage jobs automatically by processing prepared JCL statements or through equivalent interaction with a human user. Conventional job schedulers provide a graphical user interface and a single point of control for all the jobs in a distributed network of systems and computers.

Conventional job schedulers do not efficiently distribute jobs amongst the multiple systems to which they have access. For instance, job schedulers typically submit jobs to the first system which is permitted to receive that job. This may result in one particular system receiving an inordinate number of jobs when compared to the other systems. In addition, if the system is currently having a problem executing the jobs submitted to it, submission of the current job will only cause a further backlog on that system. Accordingly, there is a need in the art for a system and method for optimizing the scheduling of jobs in a network environment.

SUMMARY OF THE INVENTION

The invention provides a method and system for efficient scheduling of jobs across a network environment. In support of one aspect of the present invention, a scheduler engine determines which systems to which it can submit jobs. The analysis time period can be determined either based on a default time period or a user supplied time period. The current time period begins and the scheduler engine accepts the next job in a queue of jobs waiting to be submitted and processed.

The scheduler engine can determine a group of systems to which the job can be submitted based on an evaluation of the job or the group of systems can be provided by a user of the system. One of the systems can be selected in a round-robin format from the systems to which the scheduler engine can submit jobs. The selected system can be compared to the group of systems on which the job can be submitted to determine if the selected system is within the group. If the selected system is not within the group, another system can be selected and the first selected system can be placed in the back of the line to continue the round-robin selection format. If the selected system is within the group, the health of the selected system can be determined based on health information stored in the scheduler engine for each of the systems. If the selected system was healthy at the end of the prior analysis time period, the scheduler engine can submit the job to the selected system. If the selected system was not healthy, another system can be selected in the round-robin format and the newly selected system can be evaluated to see if it is in the group of systems on which the job can be completed.

A first counter variable can be incremented by one each time a job is submitted to a particular system and the scheduler agent for that system sends a status update to the scheduler engine that the job has been submitted. A second counter variable can be incremented by one each time the scheduler engine receives a status updated from the scheduler agent that a job on the particular system has been processed. A determination can be made as to whether the current analysis time period has expired. If the period has not expired, the scheduler engine can select the next job in the queue. Once the time period expires, the system can evaluate the health of each of the systems to which the scheduler engine can submit jobs.

The health of each system can be evaluated by accepting the first counter variable and the second counter variable for each system. The health quotient for each system can be calculated by dividing the second counter variable by the first counter variable. The health quotient can then be compared to a health value, in which, a system is designated as healthy if its health quotient is greater than the health value and unhealthy if its health quotient is less than the health value. The counter variables for each system and the analysis time period can be reset, and the scheduler engine can access the next job in the queue for evaluation and submission to one of the systems.

These and other aspects, features, and embodiments of the invention will become apparent to a person of ordinary skill in the art upon consideration of the following detailed description of the illustrated embodiments exemplifying the best mode for carrying out the invention as presently perceived.

BRIEF DESCRIPTION OF THE DRAWINGS

For a more complete understanding of the present invention and the advantages thereof, reference is now made to the following description in conjunction with the accompanying drawings in which.

DETAILED DESCRIPTION OF THE EXEMPLARY EMBODIMENTS

Figure 1:
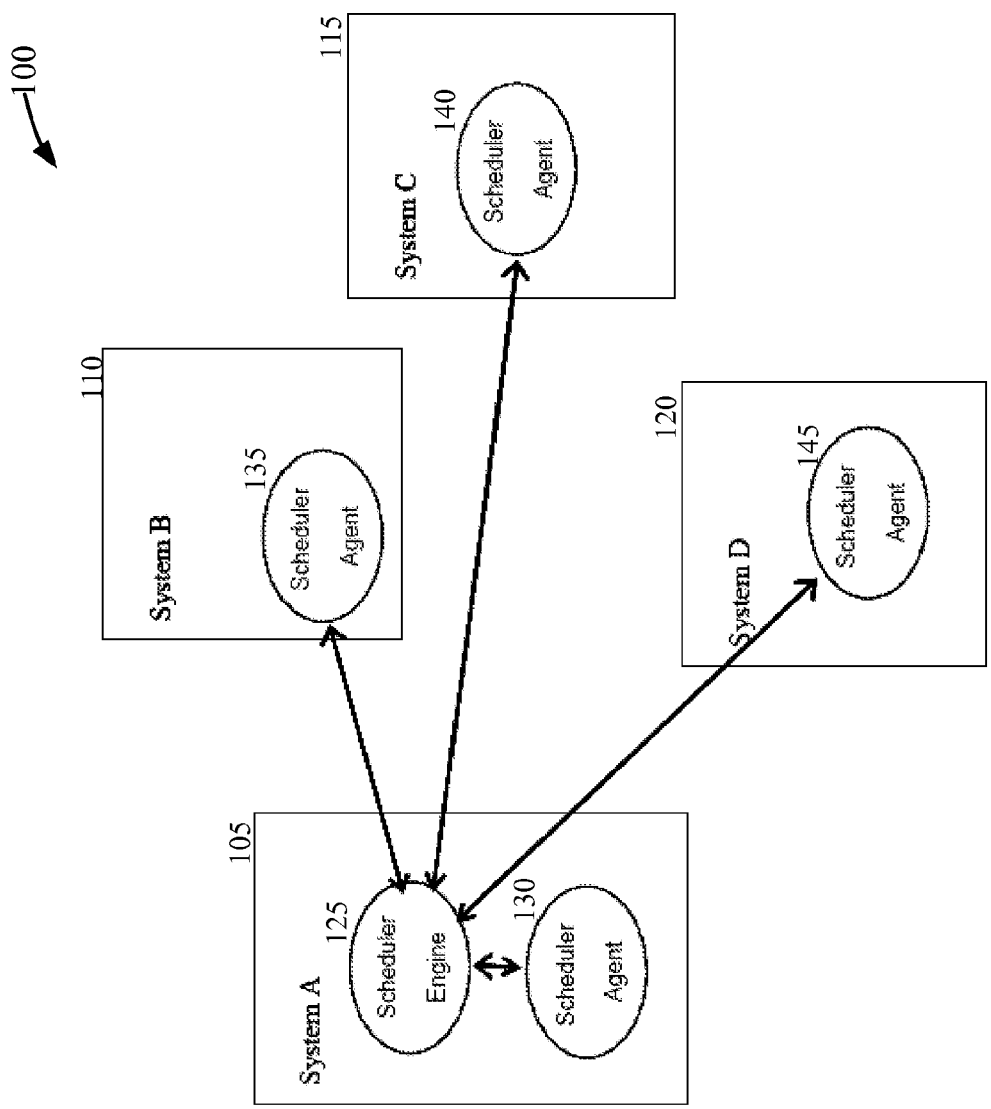
FIG. 1 is a block diagram of a workload scheduler system constructed in accordance with an exemplary embodiment of the present invention.

Referring now to the drawings in which like numerals represent like elements throughout the several figures, aspects of the present invention and an exemplary operating environment will be described in the context of FIGS. 1-6. The present invention supports a computer-implemented method for job management and health evaluation of systems and can be more readily understood by reference to the workload scheduler system 100 of FIG. 1. FIG. 1 is a block diagram illustrating a workload scheduler system 100 constructed in accordance with an exemplary embodiment of the present invention. In one exemplary embodiment, the workload scheduler system 100 is a software component that submits work, such as jobs on MVS systems, for execution according to a pre-defined schedule.

The workload scheduler system 100 includes a scheduler engine 125 running on a first system, such as system A 105. In one exemplary embodiment, the scheduler engine 125 operates on an MVS system 105. The scheduler engine 125 decides where to submit a job and sends orders to one of the scheduler agents 130-145 to execute the submission. The scheduler engine 125 can also be informed about what is happening on each system 105-120 by the scheduler agents 130-145.

The system 100 also includes one or more scheduler agents 130-145 that can be positioned on the same or different systems 105-120 from the scheduler engine 125. The scheduler agents 130-145 are typically posited on systems where the workload scheduler system 100 wants to submit and track jobs. In one exemplary embodiment, the scheduler agents 130-145 are configured to submit and track jobs on their respective systems 105-120.

Figure 2:
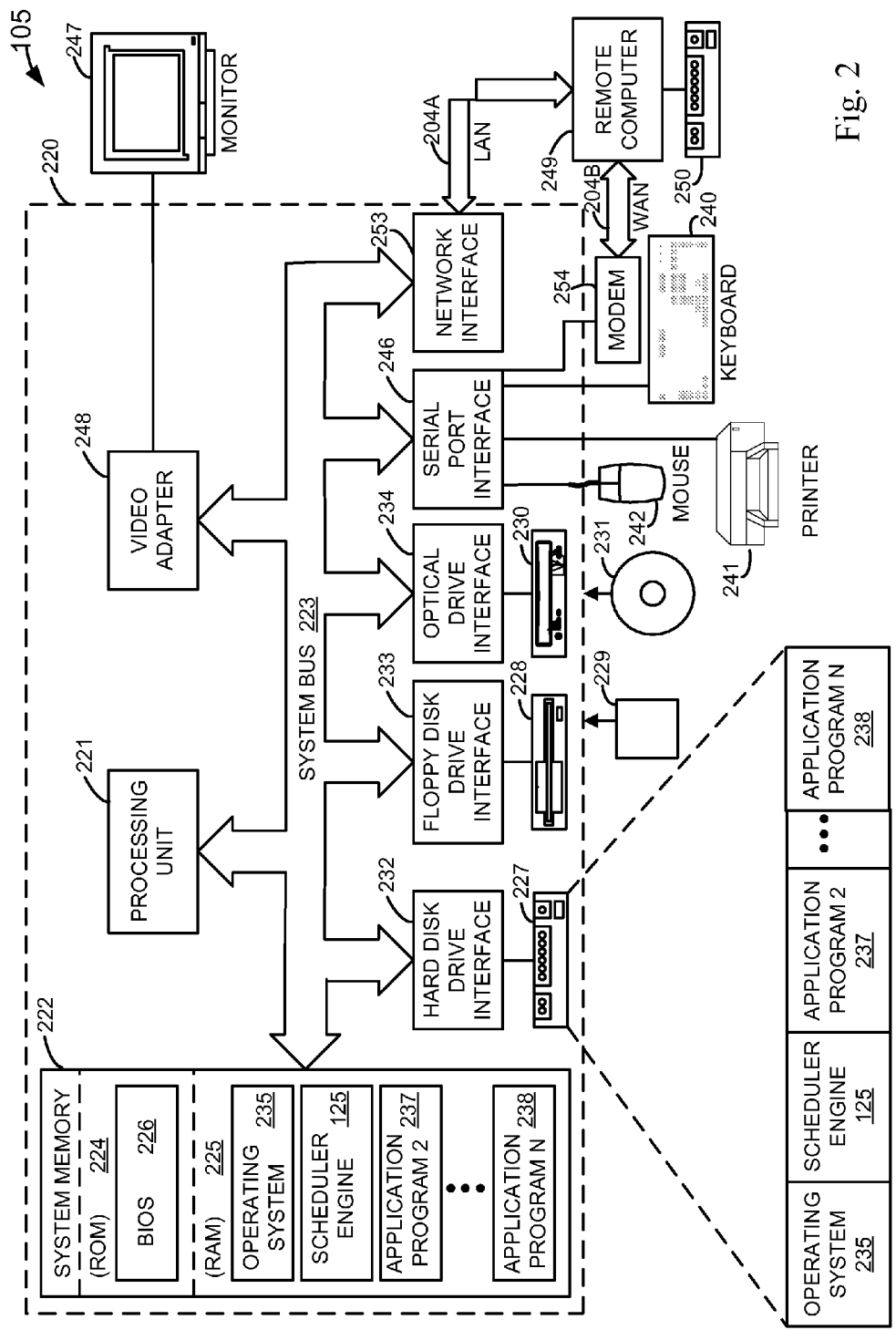
FIG. 2 is a block diagram illustrating a general component architecture for a network device constructed in accordance with an exemplary embodiment of the present invention.

FIG. 2 is a block diagram illustrating a general component architecture for system A 105, in accordance with certain exemplary embodiments. System A 105 includes a general-purpose computing device in the form of a conventional computer 220. Generally, the computer 220 includes a processing unit 221, a system memory 222, and a system bus 223 that couples various system components, including the system memory 222, to the processing unit 221. The system bus 223 can include any of several types of bus structures, including a memory bus or memory controller, a peripheral bus, or a local bus, using any of a variety of bus architectures. The system memory 222 includes a read-only memory ("ROM") 224 and a random access memory ("RAM") 225. A basic input/output system (BIOS) 226 containing the basic routines that help to transfer information between elements within the computer 220, such as during start-up, is stored in the ROM 224.

The computer 220 also includes a hard disk drive 227 for reading from and writing to a hard disk (not shown), a magnetic disk drive 228 for reading from or writing to a removable magnetic disk 229, such as a floppy disk, and an optical disk drive 230 for reading from or writing to a removable optical disk 231, such as a CD-ROM, compact disk-read/write (CD/RW), DVD, or other optical media. The hard disk drive 227, magnetic disk drive 228, and optical disk drive 230 are connected to the system bus 223 by a hard disk drive interface 232, a magnetic disk drive interface 233, and an optical disk drive interface 234, respectively. Although the exemplary system A 105 employs a ROM 224, a RAM 225, a hard disk drive 227, a removable magnetic disk 229, and a removable optical disk 231, it should be appreciated by a person of ordinary skill in the art having the benefit of the present disclosure that other types of computer readable media also can be used in the exemplary system A 105. For example, the computer readable media can include any apparatus that can contain, store, communicate, propagate, or transport data for use by or in connection with one or more components of the computer 220, including any electronic, magnetic, optical, electromagnetic, infrared, or semiconductor system (or apparatus or device) or propagation medium, such as magnetic cassettes, flash memory cards, digital video disks, Bernoulli cartridges, and the like. The drives and their associated computer readable media can provide nonvolatile storage of computer-executable instructions, data structures, program modules, and other data for the computer 220.

A number of modules can be stored on the ROM 224, RAM 225, hard disk drive 227, magnetic disk 229, or optical disk 231, including an operating system 235 and various application modules 125, 237-238. Application modules 125, 237-238 can include routines, sub-routines, programs, objects, components, data structures, etc., which perform particular tasks or implement particular abstract data types. Application module 125, referred to herein as a "scheduler engine" 125, is discussed in more detail above, with reference to FIG. 1.

A user can enter commands and information to the computer 220 through input devices, such as a keyboard 240 and a pointing device 242. The pointing device 242 can include a mouse, a trackball, an electronic pen that can be used in conjunction with an electronic tablet, or any other input device known to a person of ordinary skill in the art, such as a microphone, joystick, game pad, satellite dish, scanner, or the like. These and other input devices are often connected to the processing unit 222 through a serial port interface 246 that is coupled to the system bus 223, but can be connected by other interfaces, such as a parallel port, game port, a universal serial bus (USB), or the like. A display device 247, such as a monitor, also can be connected to system bus 223 via an interface, such as a video adapter 248. In addition to the display device 247, the computer 220 can include other peripheral output devices, such as speakers (not shown) and a printer 241.

The computer 220 is configured to operate in a networked environment using logical connections to one or more remote computers 249, such as systems 105-120. The remote computer 249 can be any network device, such as a personal computer, a server, a client, a router, a network PC, a peer device, or other device. While the remote computer 249 typically includes many or all of the elements described above relative to the computer 220, only a memory storage device 250 has been illustrated in FIG. 2 for simplicity. The logical connections depicted in FIG. 2 include a LAN 204A and a WAN 204B. Such networking environments are commonplace in offices, enterprise-wide computer networks, intranets, and the Internet.

When used in a LAN networking environment, the computer 220 is often connected to the LAN 204A through a network interface or adapter 253. When used in a WAN networking environment, the computer 220 typically includes a modem 254 or other means for establishing communications over the WAN 204B, such as the Internet. The modem 254, which can be internal or external, is connected to system bus 223 via a serial port interface 246. In a networked environment, program modules depicted relative to computer 220, or portions thereof, can be stored in the remote memory storage device 250.

It will be appreciated that the network connections shown are exemplary and other means of establishing a communications link between the computers can be used. Moreover, those skilled in the art will appreciate that the system 105 illustrated in FIG. 1 can have any of several other suitable computer system configurations. For example, the system 105 may not include certain components, in alternative exemplary embodiments. In certain exemplary embodiments, each of the systems 105-120 can include a structure similar to that described previously in connection with the system 105.

Figure 3:
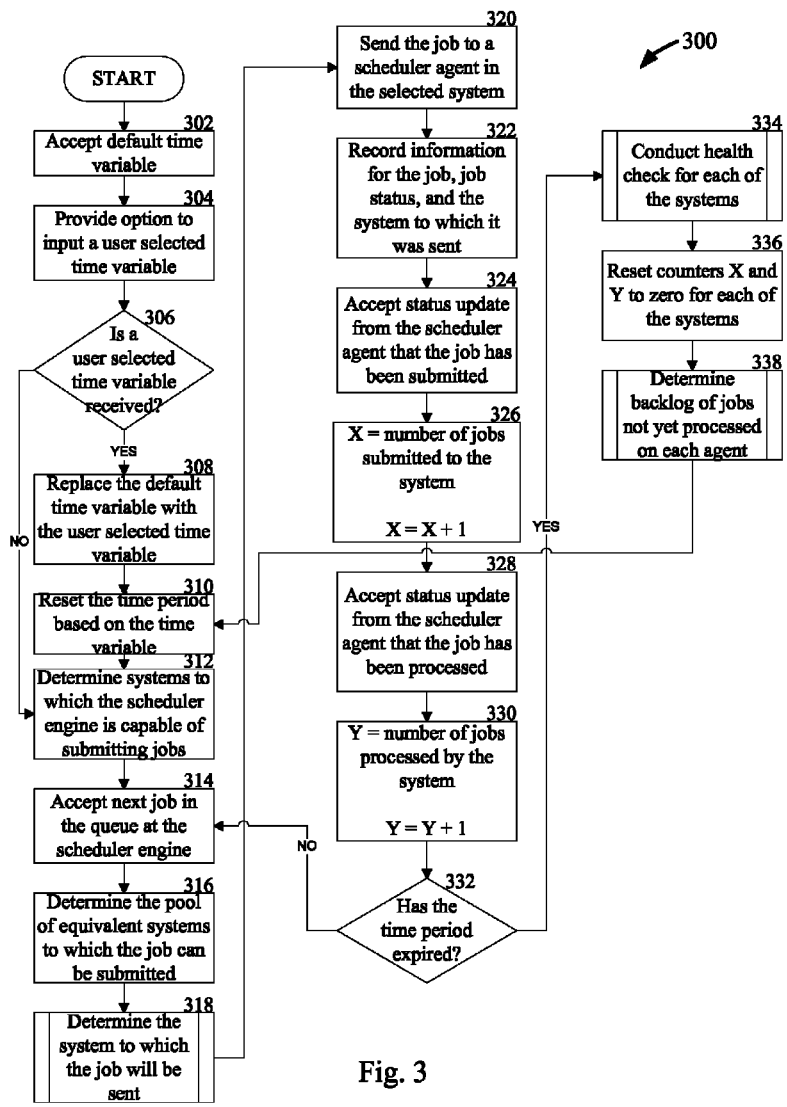
FIG. 3 is a flow chart illustrating the general steps for a process for job scheduling and management across multiple systems in accordance with an exemplary embodiment of the present invention.

FIGS. 3-6 are logical flow chart diagrams illustrating the computer-implemented processes completed by an exemplary method for job management in a z/OS operating system environment. FIG. 3 is a logical flow chart diagram 300 presented to illustrate the general steps of an exemplary process for job scheduling and management across multiple systems within the operating environment of the exemplary workload scheduler system 100 of FIG. 1.

Now referring to FIGS. 1 and 3, the exemplary method 300 begins at the START step and proceeds to step 302, in which the scheduler engine 125 accepts a default time variable. In one exemplary embodiment, the time variable is used to designate the amount of time between system status or health checks for those systems accessible by the scheduler engine 125. In one exemplary embodiment, the default time variable is five minutes. In step 304, a user or system manager is prompted with an option to provide a user selected time variable. The prompt may be by way of a pop-up screen or other methods known to those or ordinary skill in the art. In an alternative embodiment, the user may be required to take active steps to change the time variable, such as selecting an option from a drop-down box on the user interface, instead of the request being automatically provided to the user. The option provides the user with the ability to select a time variable that is different than the default time variable.

In step 306, an inquiry is conducted to determine if a user selected time variable was received. If not, the "NO" branch is followed to step 312. Otherwise, the "YES" branch is followed to step 308, where the default time is replaced with the user selected time variable. The time is reset in step 310. Those of ordinary skill in the art will recognize that the time may be set to zero and the time may count up until it reaches the time variable or the time may be set at the time variable and count down to zero. In step 312, the scheduler engine 125 determines which systems it has access to and can send jobs. In the exemplary embodiment of FIG. 1, the scheduler engine 125 can submit jobs to scheduler agents 130, 135, 140, and 145 in systems A through D 105, 110, 115, and 120. In this exemplary embodiment, the scheduler engine 125 maintains information about each system, such as how many jobs it has submitted to each system.

The scheduler engine 125 accepts the next job in the queue in step 314. In step 316, the scheduler engine 125 determines the pool of equivalent systems to which the job can be submitted. For example, while the scheduler engine 125 is able to submit jobs to systems A-D, the job may contain information that shows it can only be submitted to system B 110 and system C 115. In one exemplary embodiment, the pool of equivalent systems is determined by a user providing this information. In an alternative embodiment, the pool of equivalent systems for each job is provided with the job. The scheduler engine 125 determines which system and scheduler agent the job will be sent to in step 318. The scheduler engine 125 sends the job to the selected scheduler agent in the selected system in step 320 and records information regarding the job, job status and the system the job was sent to in step 322. For ease of reference, in this example, it will be assumed that the scheduler engine 125 selected and sent the job to the scheduler agent 135 in system B 110.

In step 324, the scheduler engine 125 accepts a status update from the scheduler agent 135 that the job has been submitted. In one exemplary embodiment, in the MVS system, the scheduler agent sends the information back when the scheduler agent puts the job on the job entry subsystem ("JES") internal reader queue. In step 326, counter variable X represents the number of jobs submitted to one of the systems and is initially set at zero at the beginning of the time period. In this embodiment, each system will have its own counter variable X. In one exemplary embodiment, the counter variable for system B 110 is incremented by one upon receipt by the scheduler engine 125 that the job has been submitted. The scheduler engine 125 accepts a status update from the scheduler agent 135, that the job has been processed in step 328. In one exemplary embodiment, in the exemplary MVS system, the scheduler agents can use the JES exits, like exit 51, to monitor the job life and inform the scheduler engine 125 of what is happening with the job. In step 330, counter variable Y is incremented by one. Counter variable Y represents the number of jobs processed by a system during the time period and is initially set at zero at the beginning of the time period. In one exemplary embodiment, each system will have its own counter variable Y.

In step 332, an inquiry is conducted to determine if the time period has expired. If the time period has not expired, the "NO" branch is followed back to step 314, where the scheduler engine 125 accepts the next job in the queue. On the other hand, if the time period has expired, the "YES" branch is followed to step 334, where the scheduler engine 125 conducts a health check for each of the systems with which it is able to schedule jobs. In step 336, the counter variables X and Y are reset to zero for each of the systems. The scheduler engine 125 determines the backlog of jobs not yet processed for each scheduler agent in step 338. The process then returns to step 310, where the time period is reset and a new analysis period begins.

Figure 4:
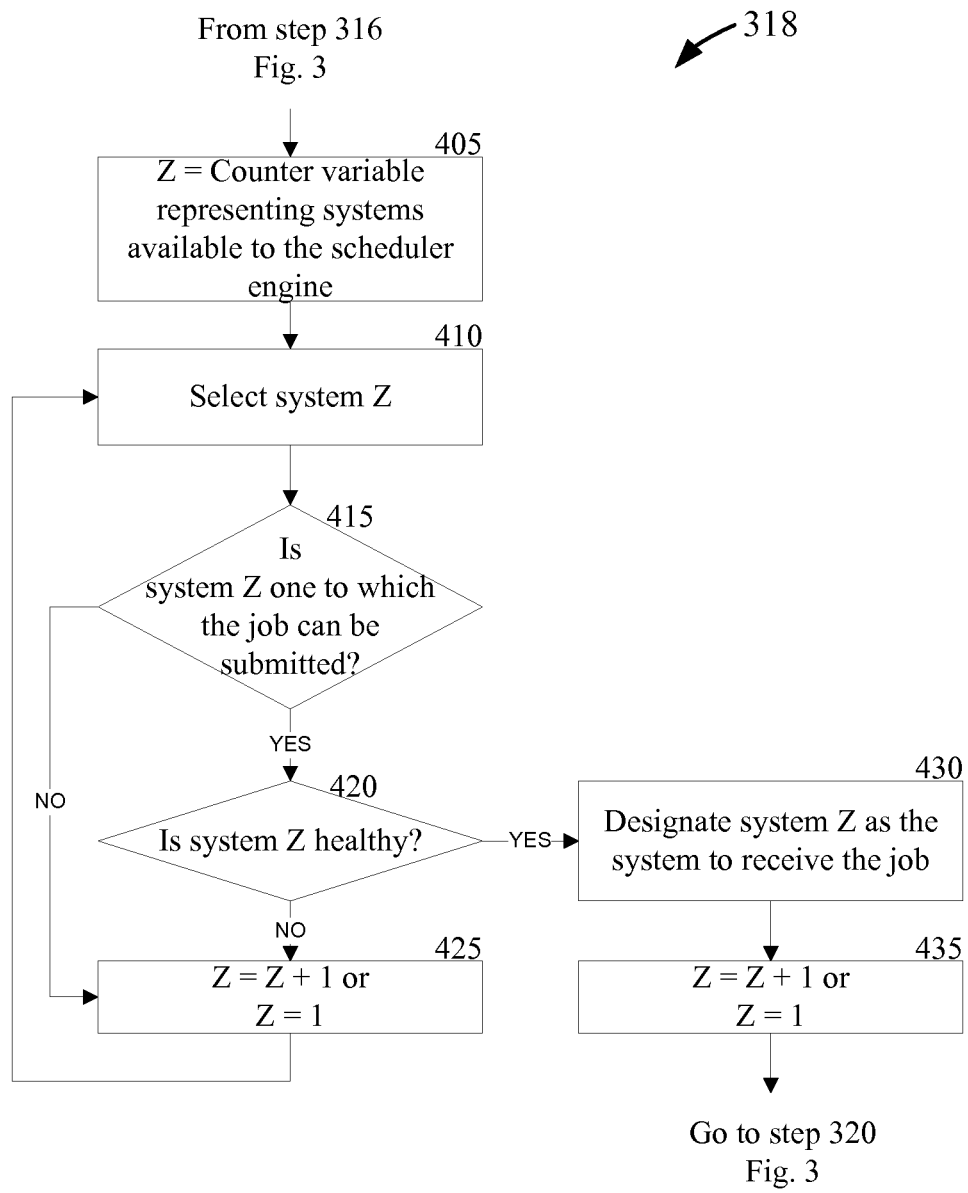
FIG. 4 is a flow chart illustrating a process for selecting a system and agent to which a job is sent in accordance with an exemplary embodiment of the present invention.

FIG. 4 is a logical flow chart diagram 318 presented to illustrate the steps of an exemplary process for selecting a system and agent to which a job is sent as completed by step 318 of FIG. 3. Now referring to FIGS. 1 and 4, the exemplary method 318 begins with a counter variable Z representing the systems available to the scheduler engine 125 for job submission. In one exemplary embodiment, the counter variable is initially set at one and selects the first system available to the scheduler engine 125. However, as the exemplary workload scheduler system 100 continues to process jobs, the counter variable continues to increment up to the total number of systems available to the scheduler engine 125. At that point the counter variable is reset to one and the scheduler engine 125 goes back through the list of available systems. In this manner, the scheduler engine 125 determines which system to evaluate for receiving the next job in a "round-robin" format.

The scheduler engine 125 selects the first system to determine if it should receive the next job in step 410. In step 415, an inquiry is conducted to determine if system Z is one to which the next job can be submitted. In one exemplary embodiment, this determination is made by the scheduler engine 125 determining if system Z is included in the pool of equivalent systems to which the job can be submitted. If the job cannot be submitted to system Z, the "NO" branch is followed to step 425, where counter variable Z is incremented by one to select the next system for evaluation. If the job can be submitted to system Z, the "YES" branch is followed to step 420.

In step 420, an inquiry is conducted to determine if system Z is healthy. One exemplary method for determining the health of a system will be described hereinafter with regards to FIG. 5. If system Z is not healthy, the "NO" branch is followed to step 425. In step 425, counter variable Z is incremented by one to select the next system for evaluation. If counter variable Z already equals the number of systems accessible for job submission by the scheduler engine 125, then counter variable Z is reset to one and the first system is selected again. Retuning to step 420, if system Z is healthy, the "YES" branch is followed to step 430, where system Z is designated to receive the job from the scheduler engine 125. In step 435, counter variable Z is incremented by one to select the next system for evaluation for the next job to be distributed by the scheduler engine 125. If counter variable Z already equals the number of systems accessible for job submission by the scheduler engine 125, then counter variable Z is reset to one and the first system is selected again.

Figure 5:
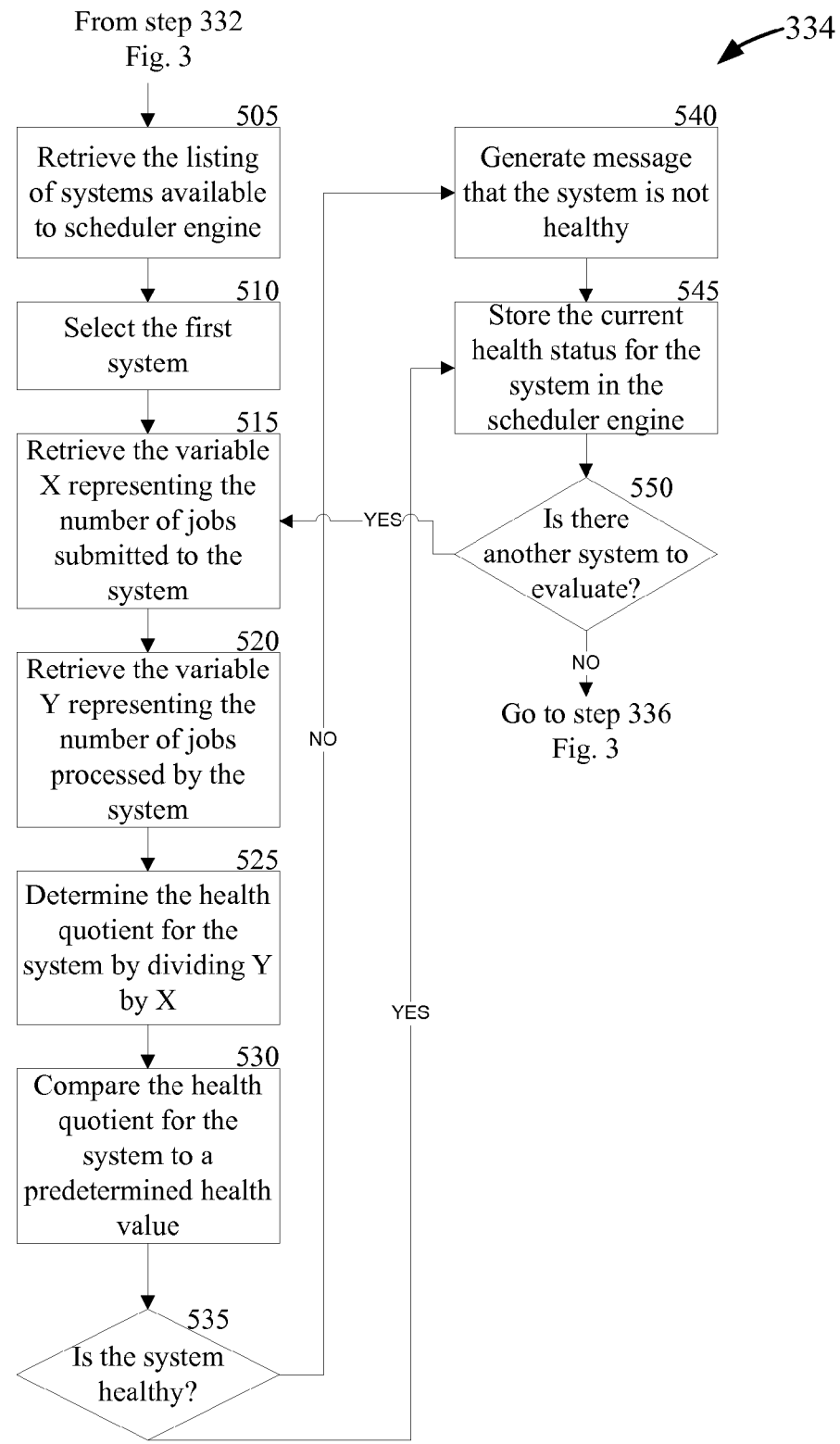
FIG. 5 is a flow chart illustrating a process for determining the health of a system to which jobs are sent in accordance with an exemplary embodiment of the present invention.

FIG. 5 is a logical flow chart diagram presented to illustrate the steps of an exemplary process for conducting a health check for each of the system as completed by step 334 of FIG. 3. Now referring to FIGS. 1 and 5, the exemplary method 334 begins by accepting a list of systems to which the scheduler engine 125 can send jobs in step 505. In step 510, the scheduler engine 125 selects the first system. The scheduler engine 125 retrieves the variable X, representing the number of jobs submitted to the system, for the just concluded time period in step 515. In step 520, the scheduler engine 125 retrieves the variable Y, representing the number of jobs processed by the system, for the time period that has just concluded.

The percentage of jobs that have been processed, as compared to those that have been submitted to the system, is determined by dividing variable Y by variable X to derive a health quotient in step 525. In step 530, the scheduler engine 125 compares the health quotient for the system to a predetermined health value. The predetermined health value can be one that is pre-set in the system or received from a user of the workload scheduler system 100. In one exemplary embodiment, the predetermined health value is ninety percent. In one exemplary embodiment, if the health quotient is less than the predetermined health value, then that particular system is deemed unhealthy. Conversely, if the health quotient for the selected system is greater than the predetermined health value, then the selected system is deemed healthy. Thus, the health of a particular system can be generally based on the percentage of submitted jobs that have been processed by the scheduler agent of the system.

In step 535, an inquiry is conducted to determine if the system and/or scheduler agent for the system are healthy. If the system and/or scheduler agent are not healthy, the "NO" branch is followed to step 540, where the scheduler engine 125 generates a message that the system and/or scheduler agent are not healthy. In one exemplary embodiment, the message can be sent by the scheduler engine 125 to an MVS console or a web user interface. If the system is healthy, the "YES" branch is followed to step 545. For both healthy and unhealthy systems, the current health status for the system is stored by the scheduler engine 125 in step 545. In step 550, an inquiry is conducted to determine if there is another system to evaluate. If so, the "YES" branch is followed to step 515. Otherwise, the "NO" branch is followed to step 336 of FIG. 3.

Figure 6:
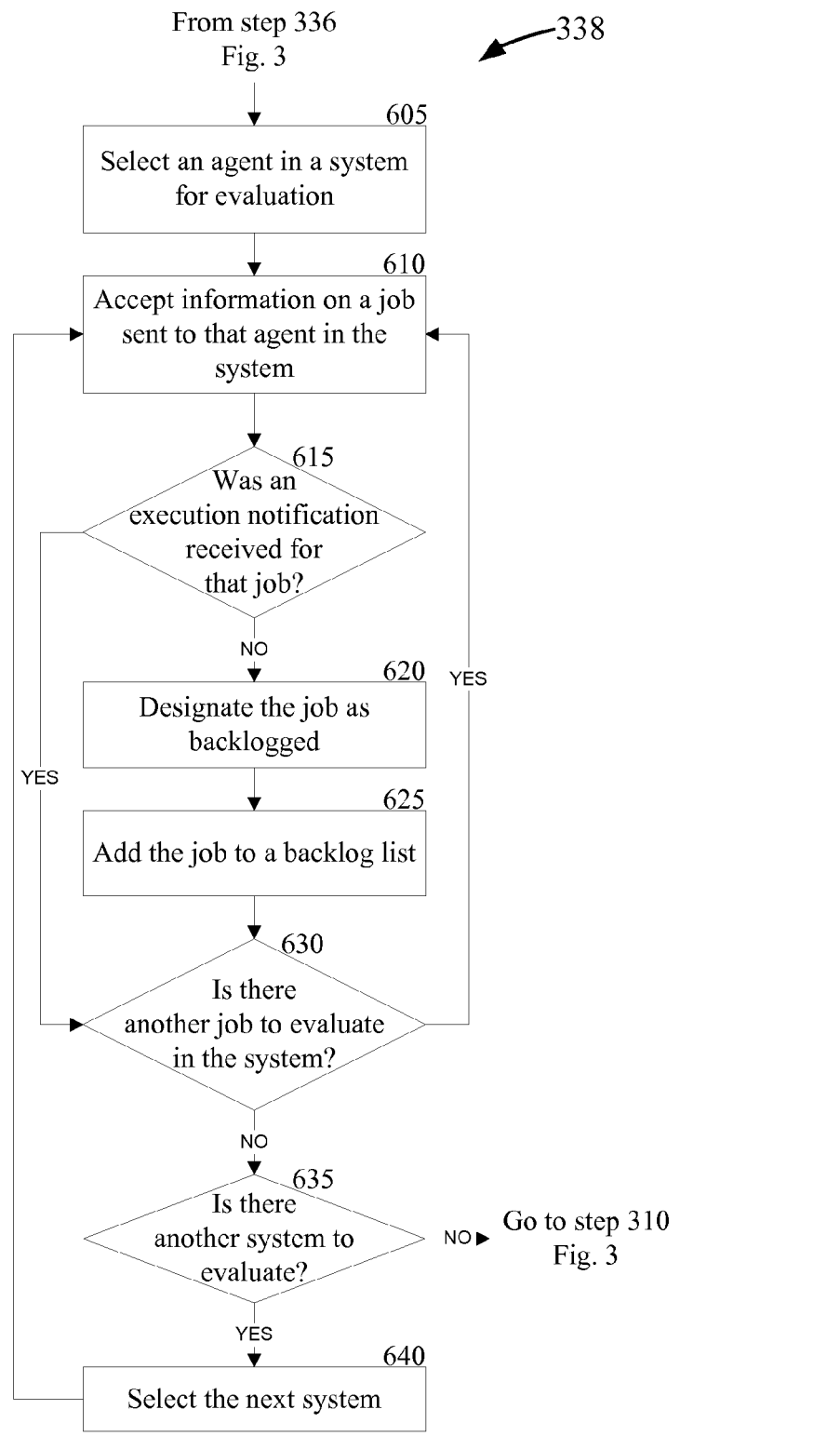
FIG. 6 is a flow chart illustrating a process for determining which jobs are backlogged in accordance with an exemplary embodiment of the present invention.

FIG. 6 is a logical flow chart diagram presented to illustrate the steps of an exemplary process for determining a backlog of jobs not yet processed on each scheduler agent in each system as completed by step 338 of FIG. 3. Now referring to FIGS. 1 and 6, the exemplary method 338 begins by selecting a scheduler agent on one of the systems to which the scheduler engine 125 can submit jobs for evaluation in step 605. In step 610, the scheduler engine 125 accepts information on a job that was submitted to a scheduler agent in a system. In one exemplary embodiment, the scheduler engine 125 is able to compare the information it receives from the scheduler agent to information the engine 125 has stored about the particular job. For exemplary purposes, the process of FIG. 6 will be described with reference to a job sent to scheduler agent 145 in system D 120.

In step 615, an inquiry is conducted to determine if the scheduler engine 125 received an execution notification for that job from the scheduler agent 145. If the scheduler engine 125 did not receive an execution notification from the scheduler agent 145, the "NO" branch is followed to step 620, where the scheduler engine 125 designates the job as being backlogged. The job is added to a backlog list for system D 120 by the scheduler agent 125 in step 625.

In step 630, an inquiry is conducted to determine if there is another job to evaluate in system D 120. If so, the "YES" branch is followed back to step 610 to receive information about the next job. Otherwise, the "NO" branch is followed to step 635. In step 635, an inquiry is conducted to determine if the scheduler engine 125 has another system to evaluate. If so, the "YES" branch is followed to step 640, where the next system is selected and the process returns to step 610 to begin retrieving job information for the next system. Returning to step 635, if there are no additional systems to evaluate, the "NO" branch is followed to step 310 of FIG. 3.

It is considered that the operations, steps, and procedures described above and illustrated in the accompanying drawings are sufficiently disclosed to enable one of ordinary skill in the art to practice the present invention. However, there are many computers, operating systems, and application programs which may be used in practicing an exemplary embodiment of the present invention. Each user of a particular computer will be aware of the language and tools which are most useful for that user's needs and purposes. In addition, although the invention was described in the context of a workload management system, those skilled in the art will appreciate that the invention can be extended to a wide variety of business management applications. It should be understood that the foregoing related only to specific embodiments of the present invention, and that numerous changes may be made therein without departing from the spirit and scope of the invention as defined by the following claims.

I claim:

1. A computer-implemented method for managing scheduling of a plurality of jobs in a queue from a scheduler engine to a plurality of scheduler agents positioned throughout a plurality of systems, comprising the steps of:
   a. a computer determining the plurality of systems the scheduler engine is capable of submitting jobs to;
   b. the computer accepting a default time variable representing a current analysis time period;
   c. the computer determining if a user selected time variable is received, wherein the user selected time variable takes the place of the default time variable;
   d. the computer beginning the current analysis time period;
   e. the computer accepting a next job in the queue as a current job;
   f. the computer determining a group of systems where the current job can be submitted, wherein the group of systems is determined based on the current job;
   g. the computer selecting a system from the plurality of systems the scheduler engine is capable of submitting jobs to, wherein the plurality of systems are in an order for selection;
   h. the computer determining if the selected system is a member of the group of systems, and, when the selected system is not a member of the group of systems,
      the computer selecting another system from the plurality of systems,
      the computer placing the selected system at a position last in the order for selection, and
      the computer repeating step (h);
   i. the computer evaluating a prior health designation for the selected system to determine if the selected system is healthy, and, when the health designation for the selected system is unhealthy,
      the computer selecting another system from the plurality of systems, the computer placing the selected system at the position last in the order for selection, and
the computer returning to step (h);
j. the computer transmitting the current job to the selected system comprising a scheduler agent;
k. the computer incrementing a first counter variable for the selected system by one upon receiving a first status update from the scheduler agent, wherein the first status update comprises information indicating that the current job has been submitted;
l. the computer incrementing a second counter variable for the selected system by one upon receiving a second status update from the scheduler agent, wherein the second status update comprises information that the current job has been processed;
m. the computer determining if the current analysis time period has expired;
n. the computer returning to step (e) to accept another next job based on a negative determination that the current analysis time period has expired;
o. the computer conducting a current health analysis for each of the plurality of systems based on a positive determination that the current analysis time period has expired, the conducting comprising
  1. the computer accepting the first counter variable for the system being analyzed;
  2. the computer accepting the second counter variable for the system being analyzed;
  3. the computer determining a health quotient for the system being analyzed by dividing the second counter variable by the first counter variable;
  4. the computer comparing the health quotient to a predetermined health value to determine a health designation, the system being analyzed receiving a health designation of healthy when the health quotient is greater than the predetermined health value and a health designation of unhealthy when the health quotient is less than the predetermined health value;
  5. the computer storing the health designation for the system being analyzed as a prior health designation for the system being analyzed; and
  6. the computer repeating steps (1)-(5) for each of the plurality of systems;
p. the computer resetting the first counter variable and the second counter variable to zero; and
q. the computer returning to step (d).

2. The computer-implemented method of claim 1, further comprising
r. the computer determining a backlog of jobs not yet processed on each of the plurality of systems.

3. The computer-implemented method of claim 2, wherein step (r) further comprises the computer adding the current job to a job backlog list when the first status update from the scheduler agent is not received.

4. The computer-implemented method of claim 1, wherein step (o) further comprises the computer generating a message indicating that the system being analyzed is unhealthy and sending the message to a user-interface, when the health quotient is less than the predetermined health value.

5. The computer-implemented method of claim 1, wherein the predetermined health value comprises a user-defined health value.

6. The computer-implemented method of claim 1, wherein step (j) further comprises the computer recording information regarding the current job, the status of the current job, and the selected system to which the current job was sent.

7. The computer-implemented method of claim 1, wherein the first counter variable and the second counter variable are reset to zero at the beginning of the current analysis time period.

8. A computer-implemented method for managing scheduling of a plurality of jobs in a queue from a scheduler engine to a plurality of scheduler agents positioned throughout a plurality of systems, comprising:
(a) a computer determining the plurality of systems the scheduler engine is capable of submitting jobs to;
(b) the computer accepting a default time variable representing a current analysis time period;
(c) the computer determining if a user selected time variable is received and replacing the default time variable with the user selected time variable based on a determination that the user selected time variable has been received;
(d) the computer beginning the current analysis time period;
(e) the computer accepting a next job in the queue as a current job;
(f) the computer determining a group of systems where the current job can be submitted based on the current job;
(g) the computer selecting a system from the plurality of systems, the plurality of systems being in an order for selection;
(h) the computer determining if the selected system is a member of the group of systems;
(i) the computer selecting another system from the plurality of systems based on a determination that the selected system is not a member of the group of systems;
(j) the computer placing the selected system at a position last in the order for selection;
(k) the computer repeating steps (h)-(j);
(l) the computer evaluating a prior health designation for the selected system to determine if the selected system is healthy,
  the computer selecting another system from the plurality of systems based on a determination that the selected system is unhealthy,
  the computer placing the selected system determined to be unhealthy at a position last in the order for selection, and
  the computer returning to step (h);
(m) the computer transmitting the current job to the selected system comprising a scheduler agent;
(n) the computer incrementing a first counter variable for the selected system by one upon receiving a first status update from the scheduler agent, the first status update comprising information indicating that the current job has been submitted;
(o) the computer incrementing a second counter variable for the selected system by one upon receiving a second status update from the scheduler agent, the second status update comprising information that the current job has been processed; and
(p) the computer determining if the current analysis time period has expired;
(q) the computer conducting a current health analysis for each of the plurality of systems based on a positive determination that the current analysis time period has expired, the conducting comprising, for each of the plurality of systems,
  1. the computer accepting the first counter variable for the system being analyzed,
  2. the computer accepting the second counter variable for the system being analyzed, 3. the computer determining a health quotient for the system being analyzed by dividing the second counter variable by the first counter variable,
4. the computer comparing the health quotient to a pre-determined health value to determine a health designation, the system being analyzed receiving a health designation of healthy when the health quotient is greater than the pre-determined health value and a health designation of unhealthy when the health quotient is less than the pre-determined health value,
5. the computer storing the health designation of the system being analyzed as a prior health designation, and
6. the computer repeating steps (1)-(5);
(r) the computer resetting the first counter variable and the second counter variable to zero; and
(s) the computer returning to step (d).

9. The computer-implemented method of claim 8, further comprising:
t. the computer determining a backlog of jobs not yet processed on each of the plurality of systems.

10. The computer-implemented method of claim 9, wherein determining a backlog further comprises the computer adding the current job to a job backlog list when the first status update from the scheduler agent is not received.

11. The computer-implemented method of claim 8, wherein conducting a current health analysis further comprises the computer generating a message at the user interface indicating that the system being analyzed is unhealthy when the health quotient is less than the predetermined health value.

12. The computer-implemented method of claim 8, wherein the predetermined health value comprises a user-defined health value.

13. The computer-implemented method of claim 8, wherein incrementing a first counter variable further comprises the computer recording information regarding the current job, the status of the current job, and the selected system to which the current job was sent.

14. The computer-implemented method of claim 8, wherein the first counter variable and the second counter variable are reset to zero at the beginning of the current analysis time period.

15. A computer readable storage device storing computer readable instructions thereon that, when executed by a computer, direct the computer to perform a method of managing scheduling of a plurality of jobs in a queue from a scheduler engine to a plurality of scheduler agents positioned throughout a plurality of systems, the method comprising:
a. the computer determining the plurality of systems to which the scheduler engine is capable of submitting jobs;
b. the computer accepting a default time variable representing a current analysis time period;
c. the computer determining if a user selected time variable is received, wherein the user selected time variable takes the place of the default time variable;
d. the computer beginning the current analysis time period;
e. the computer accepting a next job in the queue as a current job;
f. the computer determining a group of systems where the current job can be submitted, wherein the group of systems is determined based on the current job;
g. the computer selecting a system from the plurality of systems, the plurality of systems being in an order for selection;
h. the computer determining if the selected system is a member of the group of systems, and, when the selected system is not a member of the group of systems,
the computer selecting another system from the plurality of systems,
the computer placing the selected system at a position last in the order for selection, and
the computer repeating step (h);
i. the computer evaluating a prior health designation for the selected system to determine if the selected system is healthy, and, when the health designation for the selected system is unhealthy,
the computer selecting another system from the plurality of systems,
the computer placing the selected system at a position last in the order for selection, and
the computer returning to step (h);
j. the computer transmitting the current job to the selected system comprising a scheduler agent;
k. the computer incrementing a first counter variable for the selected system by one upon receiving a first status update from the scheduler agent, the first status update comprising information indicating that the current job has been submitted;
l. the computer incrementing a second counter variable for the selected system by one upon receiving a second status update from the scheduler agent, the second status update comprising information that the current job has been processed;
m. the computer determining that the current analysis time period has expired;
n. the computer returning to step (e) to accept another next job based on a negative determination that the current analysis time period has expired;
o. the computer conducting a current health analysis for each of the plurality of systems based on a positive determination that the current analysis time period has expired, the conducting comprising, for each of the plurality of systems:
1. the computer accepting the first counter variable for the system being analyzed,
2. the computer accepting the second counter variable for the system being analyzed,
3. the computer the computer determining a health quotient for the system being analyzed by dividing the second counter variable by the first counter variable,
4. the computer comparing the health quotient to a pre-determined health value to determine a health designation, the system being analyzed receiving a health designation of healthy when the health quotient is greater than the predetermined health value and a health designation of unhealthy when the health quotient is less than the predetermined health value,
5. the computer storing the health designation for the system being analyzed as a prior health designation for the system being analyzed, and
6. the computer repeating steps (1)-(5);
p. the computer resetting the first counter variable and the second counter variable to zero; and
q. the computer returning to step (d).

16. The computer readable storage device of claim 15, wherein the computer readable instructions, when executed by the computer, direct the computer to perform the method further comprising:
r. the computer determining a backlog of jobs not yet processed on each of the plurality of systems.

17. The computer readable storage device of claim 16, wherein the computer readable instructions for determining a backlog of jobs further comprise instructions for adding the current job to a job backlog list when the first status update from the scheduler agent is not received.

18. The computer readable storage device of claim 15, wherein the instructions for step (o) further comprise instructions for generating a message indicating that the system being analyzed is unhealthy and sending the message to a user-interface, when the health quotient is less than the predetermined health value.

19. The computer readable storage device of claim 15, wherein the predetermined health value comprises a user-defined health value.

20. The computer-implemented method of claim 8, further comprises the computer returning to step (e) to accept another next job based on a negative determination that the current analysis time period has expired.

* * * * *